(12) United States Patent
Kirsch et al.

(10) Patent No.: US 12,275,443 B2
(45) Date of Patent: Apr. 15, 2025

(54) METHOD AND SYSTEM FOR DATA MANAGEMENT IN A MEANS OF TRANSPORT

(71) Applicant: SIEMENS MOBILITY GMBH, Munich (DE)

(72) Inventors: Andreas Kirsch, Hemhofen (DE); Jürgen Löhr, Schnaittach (DE); Florian Ersch, Plainsboro, NJ (US)

(73) Assignee: Siemens Mobility GmbH, Munich (DE)

( * ) Notice: Subject to any disclaimer, the term of this patent is extended or adjusted under 35 U.S.C. 154(b) by 298 days.

(21) Appl. No.: 17/916,181

(22) PCT Filed: Mar. 1, 2021

(86) PCT No.: PCT/EP2021/054961
§ 371 (c)(1),
(2) Date: Sep. 30, 2022

(87) PCT Pub. No.: WO2021/197723
PCT Pub. Date: Oct. 7, 2021

(65) Prior Publication Data
US 2023/0150557 A1    May 18, 2023

(30) Foreign Application Priority Data
Mar. 30, 2020    (DE) ............ 10 2020 204 095.8

(51) Int. Cl.
*B61L 15/00*    (2006.01)

(52) U.S. Cl.
CPC ....... *B61L 15/0072* (2013.01); *B61L 15/0063* (2013.01)

(58) Field of Classification Search
CPC ............ B61L 15/0036; B61L 15/0063; B61L 15/0072; B61L 15/0081; G06F 11/165; G06F 11/1641
See application file for complete search history.

(56) References Cited

U.S. PATENT DOCUMENTS 11,182,258 B2 * 11/2021 Knestele ............. G06F 16/2272
2002/0055807 A1    5/2002 Zimmermann et al.
(Continued)

FOREIGN PATENT DOCUMENTS

| CN | 101911082 A | 12/2010 |
| CN | 102103532 A | 6/2011 |

(Continued)

OTHER PUBLICATIONS

Shi Yiming et al.: "A new highly reliable train operation monitoring device", China Railway Science, vol. 32, No. 4, Jul. 2011, pp. 134-138—English abstract on last page.

*Primary Examiner* — John Kwon
(74) *Attorney, Agent, or Firm* — Laurence A. Greenberg; Werner H. Stemer; Ralph E. Locher

(57) ABSTRACT

A method and a system are provided for data management in a transport device, in particular in a train. In a first comparison, a first count value stored in a first control device is compared with a count value stored in a second control device. In a second comparison, a count value selected from the first and second count values on the basis of a result of the first comparison is compared with a control count value stored in a safety device. On the basis of a result of the second comparison, control data stored in the safety device and associated with the control count value are acquired by the first or second control device.

14 Claims, 2 Drawing Sheets

(56) References Cited

U.S. PATENT DOCUMENTS

| | | |
|---|---|---|
| 2004/0030466 A1 | 2/2004 | Rezk |
| 2011/0022407 A1 | 1/2011 | Bewig et al. |
| 2016/0332644 A1 | 11/2016 | Hillmer et al. |
| 2017/0091051 A1 | 3/2017 | Liisberg et al. |
| 2018/0309590 A1 | 10/2018 | Beckmann et al. |
| 2019/0200977 A1* | 7/2019 | Shelton, IV ............ A61B 34/35 |
| 2020/0378789 A1 | 12/2020 | Cogiel et al. |
| 2020/0410418 A1* | 12/2020 | Martynov ............. G06F 16/122 |

FOREIGN PATENT DOCUMENTS

| | | |
|---|---|---|
| CN | 102340433 A | 2/2012 |
| CN | 106029466 A | 10/2016 |
| CN | 107187465 A | 9/2017 |
| CN | 107534592 A | 1/2018 |
| DE | 10007008 A1 | 9/2001 |
| DE | 102008004206 A1 | 7/2009 |
| DE | 102013221489 A1 | 4/2015 |
| DE | 102014206078 A1 | 10/2015 |
| DE | 102017204443 A1 | 9/2018 |
| DE | 102018101523 A1 | 7/2019 |
| EP | 0738973 A1 | 10/1996 |
| EP | 3312073 A1 | 4/2018 |
| JP | 2004138536 A | 5/2004 |
| WO | 0114195 A1 | 3/2001 |
| WO | 2015150070 A1 | 10/2015 |

\* cited by examiner

METHOD AND SYSTEM FOR DATA MANAGEMENT IN A MEANS OF TRANSPORT

FIELD AND BACKGROUND OF THE INVENTION

The present invention relates to a method and a system for data management in a means of transport, in particular in a train, and to a means of transport having such a system.

Functions, or components, of means of transport such as trains are generally controlled by usually decentralized control apparatuses, also referred to as automation devices. In order to be able to ensure that the components, or the means of transport, are functional even in the event of a failure, e.g. given a defect, in such a control apparatus, these control apparatuses are typically of redundant design, i.e. provided in at least duplicate. One of the control apparatuses in this case operates as the so-called master, while the other is operated as the so-called slave, or in standby.

To control the functions, or components, of the means of transport, for example doors, lighting, air conditioning and/or the like, the control apparatus operating as the master generates control data. In order to allow smooth operation of the means of transport, it is known practice to store these generated control data continuously and preferably permanently in a backup apparatus, usually—albeit not imperatively—centrally. In this regard, the term used is also persisting these data. As such, if the master control apparatus suddenly fails, the control apparatus hitherto operated in standby is able to seamlessly continue control on the basis of the stored control data. Also, if the master control apparatus is restarted or "reset", for example after maintenance, repair or replacement thereof, it is possible to use the stored control data to allow consistent continued operation.

SUMMARY OF THE INVENTION

It is an object of the present invention to further improve the management of data in a means of transport, in particular a train, in particular to increase security and/or reliability for the management of these data.

This object is achieved by a method and a system for data management in a means of transport, in particular a train, and a means of transport having such a system according to the independent claims.

A, in particular computer-implemented, method for data management in a means of transport, in particular in a train, according to a first aspect of the invention comprises (i) a first count stored in a first control apparatus being compared, in a first comparison, with a count stored in a second control apparatus and (ii) a count selected from the first and second counts on the basis of a result of the first comparison being compared, in a second comparison, with a check count stored in a backup apparatus. Moreover, (iii) a result of the second comparison is taken as a basis for control data linked with the check count that are stored in the backup apparatus being adopted by the first or second control apparatus.

A control apparatus for the purposes of the invention is preferably a, in particular decentralized, apparatus for controlling functions, or components, of a means of transport. The control apparatus can in particular control components and/or functions of means of transport, e.g. the opening and closing of doors, the lighting, the air conditioning and/or the like. Alternatively or additionally, the control apparatus can also acquire operating parameters of the components, or the means of transport, and if necessary process them further for control purposes, for example a present opening state of a door, a present lighting scenario, a present speed of travel, a present mileage and/or the like. For this purpose, the control apparatus preferably comprises a computing means, e.g. a processor, and/or a storage means, e.g. a flash memory. The storage means may also be configured to store the first count.

A backup apparatus for the purposes of the invention is preferably a, in particular central, apparatus for, in particular permanently, backing up control data provided by a control apparatus, for example in order to control a component. For this purpose, the backup apparatus may comprise a storage means that is preferably configured to store a check count and/or control data transferred to the backup apparatus. The backup apparatus is preferably in the form of a central (means of transport) server connected to multiple control apparatuses e.g. in a network, for example via a bus system.

A count for the purposes of the invention is preferably a measure of an operating time of a control apparatus, for example a period of time that has elapsed since the control apparatus was initialized. In other words, the count preferably corresponds to a counter reading. The count may in particular indicate a time during operation. If the count has been or is linked with control data, the count may be a measure of the currentness of these control data.

Adoption of control data for the purposes of the invention is preferably use of these control data. By way of example, adopted control data may be taken as a basis for a data processing, in particular the generation of current control data. Adopted control data may in particular be taken as a basis for an initialization of a control apparatus. By way of example, a control apparatus can perform a control task on the basis of or based on the adopted control data.

One aspect of the invention is based on the approach of recognizing the currentness of control data that have been or are generated by a control apparatus and, preferably permanently, stored to a backup apparatus by linking counts with the stored control data and comparing said counts with one another as required, for example after a control apparatus is restarted, for example due to a failure or changeover to a master mode. Such a count may be generated using a counter of the control apparatus, for example.

In particular a check count linked with the control data may be compared with a currently generated count of the control apparatus in this case. This comparison preferably ascertains whether the data stored in the backup apparatus are still current or already obsolete. Accordingly, it is possible to decide whether the control data stored in the backup apparatus should be adopted, e.g. in order to initialize the control apparatus. In other words, it is possible to recognize when the control data stored in the backup apparatus were last updated.

To allow for control apparatuses usually being redundant, the counts stored in each of the two control apparatuses are initially compared with one another in a first comparison before the (second) comparison with the check count. On the basis of a result of this first comparison, one of the two counts can then be selected during the second comparison and compared with the check count. This makes it possible to ensure that the check count is compared with the currently valid count, e.g. even in the event of an intervening failure in one of the two control apparatuses. This can increase the confidence in the result of the second comparison.

The linking of the check count with the control data stored in the backup apparatus can thus allow or at least facilitate checking of the consistency of the control data (in terms of currentness). It is possible to link the check count with the control data for example by virtue of the check count being a part of these data, or being made such a part. It is in particular conceivable to integrate the count into the control data as so-called metadata, for example to write them to a header and/or the like. Alternatively, however, it is also conceivable for the check count to have been or to be stored in a database of the backup apparatus separately with a reference to the applicable control data.

According to the invention, it is thus possible to ensure for example that no obsolete process data are used to influence the process, e.g. the control of a means of transport, when a control apparatus is restarted. To put it another way, it is possible for example to avoid using (obsolete) control data to control a train door that a train driver has marked as faulty. The comparison of the counts makes it possible to ensure that the current control data, which contain an indication of the fault and have been stored on a control apparatus, are used even if, following a restart, a different control apparatus becomes active that does not "know" that the door is faulty.

Preferred embodiments of the invention and the developments thereof are described below, each of these being able to be combined with one another and with the aspects of the invention described below in any desired manner, unless expressly ruled out.

In one preferred embodiment, the first count is incrementally increased in the first control apparatus and stored. The increased first count is then preferably transferred to the backup apparatus, and there the increased first count is linked with the control data as the check count and stored. For this purpose, the first control apparatus may comprise a counter that incrementally increases the count. The transfer to the backup apparatus allows the check count to be kept current.

In a further preferred embodiment, current control data generated by the first control apparatus are transferred to the backup apparatus together with the increased count. The transferred current control data are preferably linked with the count, which preferably forms the check count, in the backup apparatus and stored. This makes it possible to ensure that the control data always have the correct associated count, or check count.

It is conceivable for the increased count to be transferred to the backup apparatus as part of the control data. The count may form metadata of the control data, for example, or can be, or may have been, written to the control data as such metadata. This simplifies the linking of the check count and the control data in the backup apparatus, because it is then simple to achieve as a result of the control data being stored.

In a further preferred embodiment, the first count is incrementally increased in the first control apparatus and stored and transferred to the second control apparatus. The increased first count is preferably stored in the second control apparatus as the second count. This makes it possible to ensure that the control function can be seamlessly undertaken by the second control apparatus, for example if the first control apparatus fails due to a fault or is taken out of operation for maintenance or repair purposes. In particular, it is possible to prevent the second count and the check count from being, or becoming, inconsistent.

In a further preferred embodiment, the basis taken for the second comparison is the count that is higher. The reason is that the higher count may potentially correspond to longer faultless operation. In particular, it is thus possible to avoid comparing a count that has been reset, and is therefore inconsistent, with the check count when operation of a control apparatus is resumed. This allows smooth operation of the means of transport, or its components.

In a further preferred embodiment, the first and/or the second comparison is performed if there is a predefined operating situation. In this context, a predefined operating situation may correspond for example to (fresh) startup, or to restarting, of a control apparatus, for example after a fault or maintenance, or repair. Alternatively or additionally, there may be a (different) predefined operating situation in the event of a change of operating mode from standby to master and/or vice versa. In such an operating situation, or after a predefined operating situation of this kind has been identified, the validity of the control data stored in the backup apparatus may be signalled on the basis of a result of the second comparison.

In a further preferred embodiment, a count to be taken as a basis for the second comparison is selected, preferably from the first and second counts, on the basis of a result of a check to determine whether a count is stored in the first and/or second control apparatus. If, for example after the first control apparatus is reset, or restarts, there is no longer a first count stored in the first control apparatus, the second count stored in the second control apparatus may be compared with the check count. If, on the other hand, it is found that there is no second count stored in the second control apparatus, the count stored in the first control apparatus may be compared with the check count. The check to determine whether there is a first and/or second count thus allows sound data management.

In a further preferred embodiment, the second comparison comprises checking whether a difference between the counts reaches or exceeds a predefined difference threshold. If the reference between the check count and the first count, or the second count, reaches or exceeds the predefined difference threshold, this may be an indication that the control data stored in the backup apparatus are inconsistent, i.e. invalid because they are not current. In this case, an appropriate error reaction, e.g. the initiation of a registration cycle, preferably takes place. As a result, the occurrence of errors in the control of components and/or functions of the means of transport may be avoided or at least the frequency of occurrence of control errors may be reduced. Alternatively or additionally, the control apparatuses may transition to cyclic normal operation, i.e. for example may cyclically increase the first count and transfer it to the backup apparatus, if necessary in combination with the control data, in order to minimize the effects of an inconsistency between the counts.

In a further preferred embodiment, an error signal is generated if the difference between the two counter readings reaches or exceeds the predefined difference threshold. For example, this error signal may be taken as a basis for initiating an error reaction, for example starting a registration cycle for at least one of the control apparatuses.

In a further preferred embodiment, the first count is cyclically increased in the first control apparatus in a predefined time interval. In other words, the first count may be regularly increased in the first control apparatus and, if necessary, stored, for example in a storage means of the first control apparatus, e.g. a flash memory. This allows a particularly reliable check on the currentness of the control data stored in the backup apparatus.

The predefined time interval may have a length of between 1 millisecond and 1 hour, preferably between 1 second and 10 minutes, in particular of approximately 30 seconds. This allows currently generated control data to be assigned a current count almost always or at least with a high level of probability.

In a further preferred embodiment, the storage and/or transfer of the first count, for example to the second control apparatus and/or to the backup apparatus, comprises ascertaining and checking a checksum of the first counter reading. The checksum may be a CRC32 checksum, for example. Should distortions in the counts arise, e.g. as a result of a transfer, these can be detected on the basis of the check on the checksum.

A system for data management in a means of transport, in particular in a train, according to a second aspect of the invention comprises a first control apparatus, a second control apparatus and a backup apparatus. According to the invention, the system is configured to compare, in a first comparison, a count stored in the first control apparatus with a count stored in the second control apparatus and to compare, in a second comparison, a count selected from the first and second counts on the basis of a result of the first comparison with a check count stored in the backup apparatus. Moreover, the control apparatuses are configured to take a result of the second comparison as a basis for adopting control data linked with the check count that are stored in the backup apparatus.

The first and/or second control apparatus in this case preferably comprises a counter that is configured to generate, in particular to incrementally increase, i.e. increment, the first, or second, count. By way of example, the first control device may comprise a software module that is able to cyclically generate the first count and transfer it to the backup apparatus and/or the second control apparatus, preferably by using available basic services, for example via a network such as a bus system.

The software module may also be configured to request the check count stored in the backup apparatus and to compare it with the locally stored first count. The software module may then signal the validity of the control data, for example using an appropriate output signal.

A means of transport, in particular a train, according to a third aspect of the invention comprises a system for data management according to the second aspect of the invention.

The description of preferred embodiments of the invention that has been given hitherto contains numerous features, some of which are reproduced in the individual dependent claims in a manner combined as a plurality. However, these features may also be considered individually and combined to form useful further combinations. In particular, each of these features is individually combinable in any desired suitable combination with the method according to the first aspect of the invention, the system according to the second aspect of the invention and the means of transport according to the third aspect of the invention.

The properties, features and advantages of the invention that are described above and the way in which they are achieved are explained in more detail in association with the FIGS. in the description of exemplary embodiments of the invention that follows. The same reference signs for the same or corresponding elements of the invention are used throughout the figures. The exemplary embodiments serve to explain the invention and do not limit the invention to the combinations of features specified therein, nor do they limit it with regard to functional features. Moreover, features of the exemplary embodiments that are suitable for this may also be considered explicitly in isolation and combined with any of the claims.

BRIEF DESCRIPTION OF THE FIGURES

In the figures, at least in some cases schematically.

DETAILED DESCRIPTION OF THE INVENTION

Figure 1:
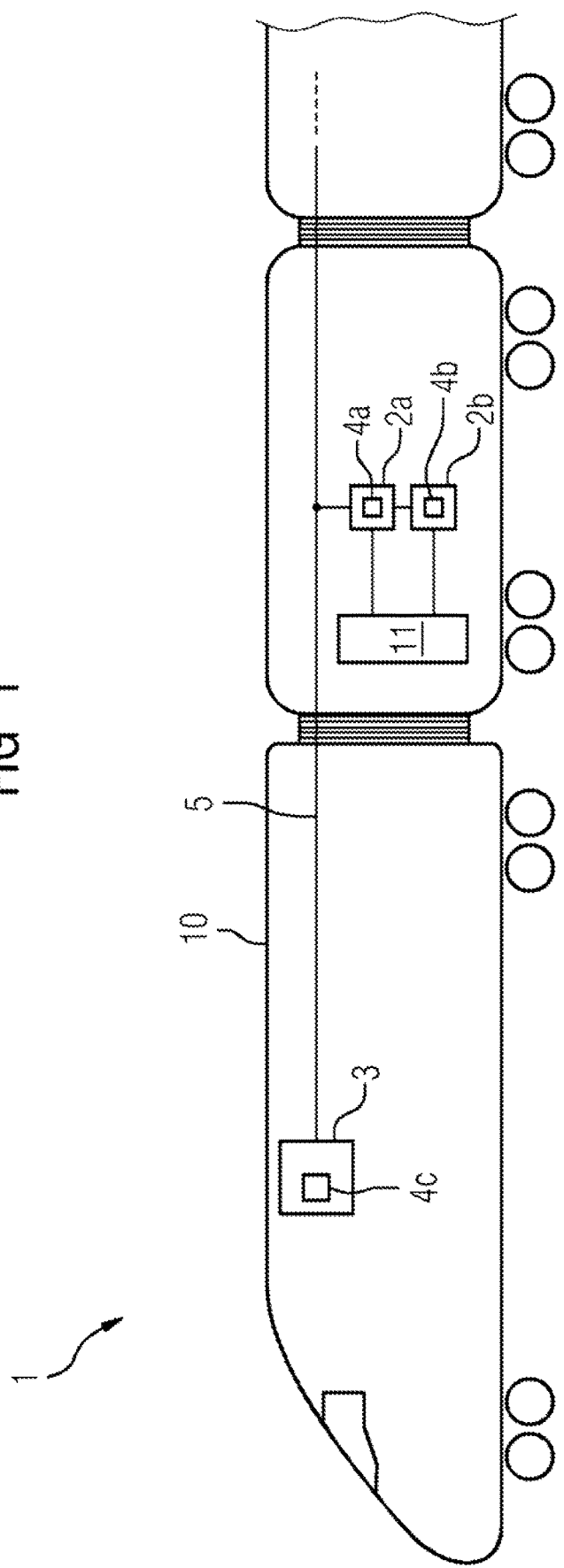
FIG. 1 shows an example of a means of transport having a system for data processing.

FIG. 1 shows an example of a means of transport 10 having a system 1 for data processing. The system 1 comprises a first decentralized control apparatus 2a, a second decentralized control apparatus 2b and a central backup apparatus 3 and is configured to compare, in a first comparison, a count stored in the first control apparatus 2a with a count stored in the second control apparatus 2b and to take a result of the first comparison as a basis for comparing, in a second comparison, the first or second count with a check count stored in the backup apparatus 3. Both the first and the second control apparatus 2a, 2b are moreover configured to take a result of the second comparison as a basis for adopting control data linked with the check count that are stored in the backup apparatus 3.

In the present example, the means of transport 10 is in the form of a train that has an (internal) network 5, e.g. in the form of a bus system. The central backup apparatus 3 is connected to the decentralized control apparatuses 2a, 2b, which are e.g. arranged in a wagon of the train, via this network 5.

The backup apparatus 3 in the present example is a central (train) server that is able to coordinate the control of components of the means of transport 10, for example doors 11, the lighting, the air conditioning and/or the like, by way of control apparatuses such as the first and second control apparatuses 2a, 2b. The control apparatuses 2a, 2b are configured to generate control data for controlling the particular component(s) connected to them. In the example shown, the control apparatuses 2a, 2b are connected to a door 11.

For the purpose of component control, the control apparatuses 2a, 2b may possibly also be configured to record sensor data, for example via the network 5, and to process said data. The control apparatuses 2a, 2b are also referred to as automation devices.

In order to be able to continuously ensure that the components such as the door 11 are functional, the control apparatuses 2a, 2b are of redundant design, one of the two control apparatuses 2a, 2b operating as master and the other in standby. If for example the second control apparatus 2b, operating as the master, fails, the first control apparatus 2a, which has operated in standby up to this time, is able to jump in and undertake control of the door 11.

The system 1 is preferably configured to store at least the current control data, for example the current control signal for a door actuator, during normal operation. Storage means 4a, 4b of the first and second control apparatuses 2a, 2b do not generally have the necessary storage space for this, however, and/or are also not configured to permanently store data. The storage means 4a, 4b may be flash memory, for example, and so data stored on them are lost if the applicable control apparatus 2a, 2b is deenergized, for example as a result of a fault or during a shutdown.

The control data generated to control the door 11 may therefore be transferred from the control apparatus 2a, 2b operated as the master to the backup apparatus 3 via the network 5 and preferably permanently stored in a storage means 4c of the backup apparatus 3. When one of the control apparatuses 2a, 2b (re)starts as the master, or the master function is undertaken, the applicable control apparatus 2a, 2b is then able to use the network 5 to access the control data stored in the backup apparatus 3. Purely by way of illustration, to simplify matters, it is assumed below that the first control apparatus 2a is operated as the master.

In order to allow seamless continuation of control of the door 11 when the first control apparatus 2a is starting, e.g. when the master function is undertaken by the second control apparatus 2b, but also after the first control apparatus 2a has been deenergized and restarted (as the master) for repair and/or for the purpose of replacement, the first control apparatus 2a may be configured to initially perform the first comparison and to take a result of the first comparison as a basis for selecting the count stored for example in the storage means 4a of the first control apparatus 2a or the count stored for example in the storage means 4b of the second control apparatus 2b. The first control apparatus 2a can then use the selected count to perform the second comparison and may possibly adopt the control data stored in the backup apparatus 3.

The manner in which the first and/or the second comparison proceed is explained below in association with FIG. 2.

Figure 2:
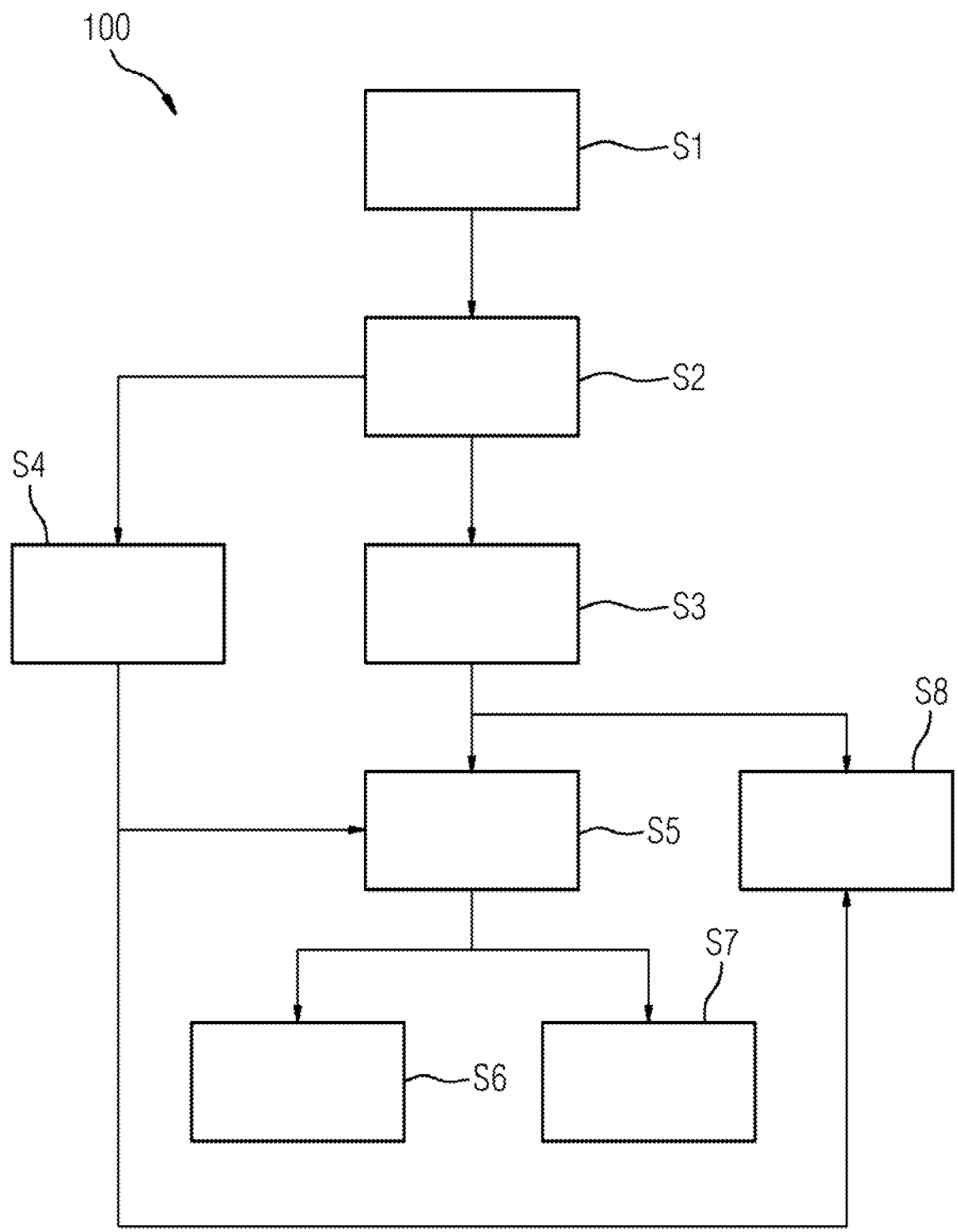
FIG. 2 shows an example of a method for data management in a means of transport.

FIG. 2 shows an example of a method 100 for data processing in a means of transport, in particular in a train.

If a control apparatus of redundant design, for example designed to control a component of a means of transport, starts as the master, the control apparatus is able to adopt current control data, stored in a backup apparatus beforehand, in order to allow smooth (continued) operation of the component of the means of transport. The control apparatus starting as the master is referred to as the first control apparatus below purely by way of illustration. The redundancy is achieved by way of the provision of an identical second control apparatus.

In a method step S1, the first control apparatus performs a first comparison between a first count, which is stored in the first control apparatus, and a second count, which is stored in the second control apparatus. The counts are preferably the product of a counter of the first or second control apparatus that generates, or outputs, counts during normal operation.

The first comparison may involve the first control apparatus in particular checking which of the two counts is higher. If the first control apparatus is starting after it has been deenergized for the purpose of a repair, for example, the second count may be higher than the first count, since the first control apparatus has been temporarily out of operation. If the first control apparatus has undertaken control of the component of the means of transport from the second control apparatus, on the other hand, since the second control component has failed due to a fault, the first count may be higher than the second count.

Depending on a result of the first comparison, the first control apparatus preferably selects one of the two counts, in particular the higher of the two counts, in a further method step S2. If the two counts are equal, it does not matter which of the counts is selected. In that case, the first control apparatus may select the first count, for example.

After one of the two counts has been selected, a second comparison is performed, likewise in method step S2, between the selected count and a check count stored in the backup apparatus. In particular, this may comprise checking whether the selected count and the check count at least substantially match, or whether a difference between the selected count and the check count reaches or exceeds a predefined difference threshold.

The first control apparatus is preferably configured to request the check count from the backup apparatus via a network, for example a bus system of the means of transport, and to compare said check count with the selected count.

Depending on a result of the second comparison, the first control apparatus may then adopt the control data linked with the check count that are stored in the backup apparatus, in a further method step S3. If the difference between the selected count and the check count does not reach or exceed the predefined difference threshold, i.e. if the selected count and the check count substantially match, this is a signal that the control data stored in the backup apparatus are current, or valid. In that case, they may be adopted and e.g. taken as a basis for continuing control of a component of the means of transport.

Otherwise, an error signal may be output, for example in a further method step S4. The error signal is preferably taken as a basis for initiating an error reaction, for example starting a registration cycle for the first control apparatus.

Subsequent to method step S3 or S4, the first control apparatus preferably transitions to normal operation, the first count preferably being cyclically incrementally increased and stored by the first control apparatus in a further method step S5. Moreover, the increased count is transferred to the second control apparatus, and stored there, in a further method step S6. This means that in future, should the first or the second control apparatus start as the master, the first comparison can again be performed in method step S1.

Moreover, the increased count may also be transferred to the backup apparatus, and stored there as the (current) check count, in a further method step S7 in parallel with method step S6. The current check count is then preferably also linked with current control data in the backup apparatus. This means that in future, should the first or the second control apparatus start as the master, the second comparison can again be carried out in method step S2.

During normal operation, the control data are likewise generated by the first control apparatus and transferred to the backup apparatus, and stored there, in a method step S8 in parallel with method step S5. The increased count may be transferred to the backup apparatus, if necessary in combination with the current control data, in particular as part of the control data, for example in the form of metadata, in method step S6. This results in reliable linking of the check count with the control data in the backup apparatus.

The invention claimed is:

1. A method for data management in a means of transport, which comprises the steps of:
   comparing a first count stored in a first control apparatus, in a first comparison, with a second count stored in a second control apparatus;
   comparing a count selected from the first and second counts on a basis of a result of the first comparison, in a second comparison, with a check count stored in a backup apparatus;
   taking a result of the second comparison as a basis for control data linked with the check count that are stored in the backup apparatus being adopted by the first control apparatus or the second control apparatus; and
   performing at least one of the first comparison or the second comparison when there is a predefined operating situation.

2. The method according to claim 1, which further comprises:
incrementally increasing the first count in the first control apparatus and storing an increased first count in the first control apparatus; and
transferring the increased first count to the backup apparatus, and there the increased first count is linked with the control data as the check count and stored.

3. The method according to claim 2, which further comprises transferring current control data generated by the first control apparatus to the backup apparatus together with the increased first count, and there the current control data are linked with the count and stored.

4. The method according to claim 1, which further comprises:
incrementally increasing the first count in the first control apparatus and storing an increased first count in the first control apparatus; and
transferring the increased first count to the second control apparatus, and there the increased first count is stored as the second count.

5. The method according to claim 1, wherein the basis taken for the second comparison is the count that is higher.

6. The method according to claim 1, which further comprises selecting the count to be used for the second comparison on a basis of a result of a check to determine whether the count is stored in at least one of the first control apparatus or the second control apparatus.

7. The method according to claim 1, wherein the second comparison comprises the step of checking whether a difference between counts reaches or exceeds a predefined difference threshold.

8. The method according to claim 7, which further comprises generating an error signal if the difference between two counter readings reaches or exceeds the predefined difference threshold.

9. The method according to claim 1, which further comprises increasing cyclically the first count in the first control apparatus in a predefined time interval.

10. The method according to claim 1, wherein a storage and/or a transfer of the first count includes ascertaining and checking a checksum of a first counter reading.

11. The method according to claim 1, wherein the means of transport is a train.

12. A system for data management in a means of transport, the system comprising:
a first controller;
a second controller;
a backup apparatus; and
the system being configured to compare, in a first comparison, a count stored in said first controller with a count stored in said second controller and to compare, in a second comparison, a count selected on a basis of a result of the first comparison with a check count stored in said backup apparatus, and said first and second controllers are configured to take a result of the second comparison as a basis for adopting control data linked with the check count that are stored in said backup apparatus, the system further configured to perform at least one of the first comparison or the second comparison when there is a predefined operating situation.

13. The system according to claim 12, wherein the means of transport is train.

14. A means of transport, comprising:
said system for data management according to in claim 12.

* * * * *